Figure 1:
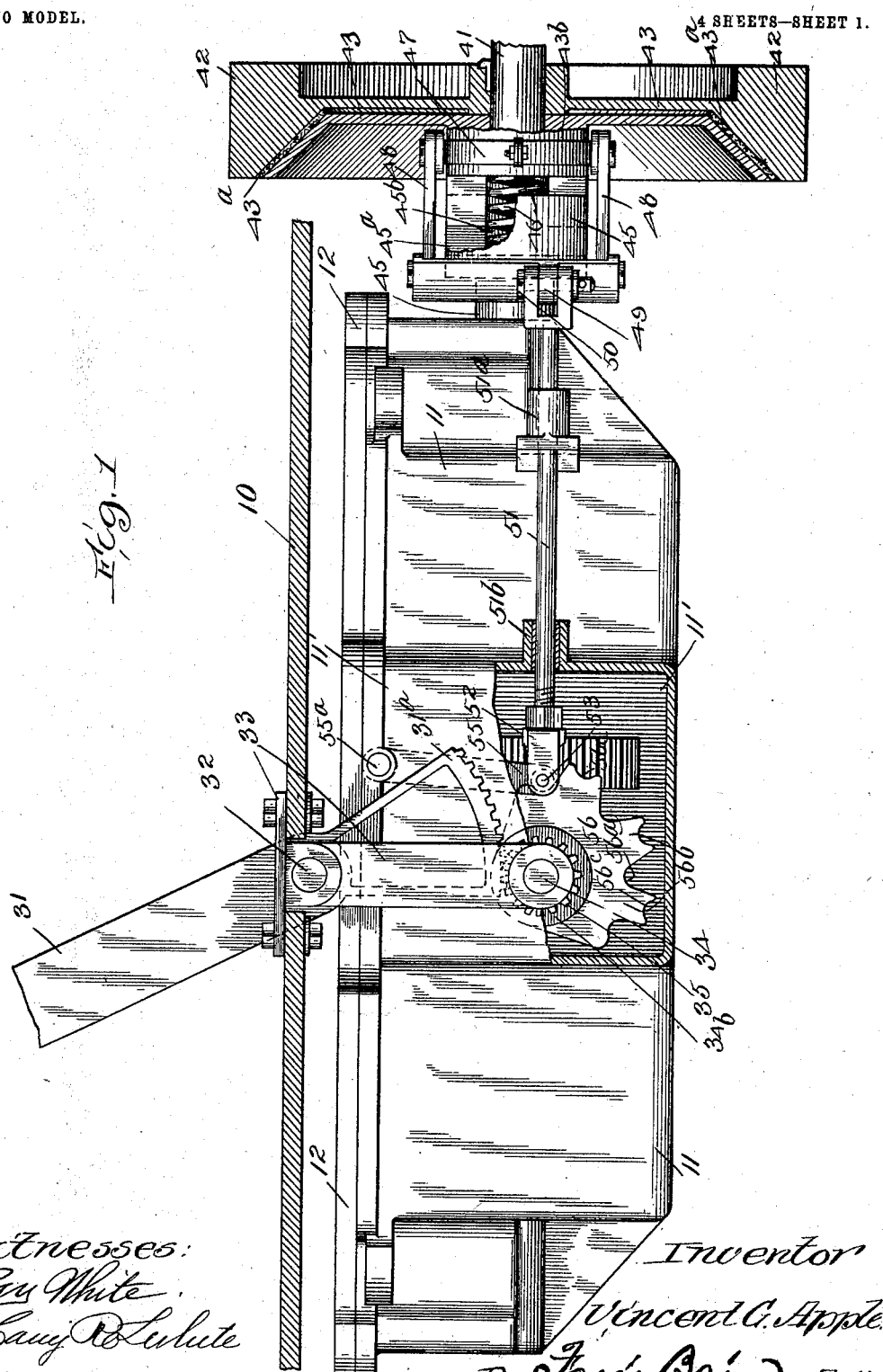

No. 748,334. PATENTED DEC. 29, 1903.
V. G. APPLE.
VARIABLE SPEED TRANSMISSION GEAR.
APPLICATION FILED JUNE 8, 1903.
NO MODEL. 4 SHEETS—SHEET 1.

Witnesses:
Ray White
Harry R. Lulute

Inventor
Vincent G. Apple
By Forée Bain Atty.

No. 748,334. PATENTED DEC. 29, 1903.
V. G. APPLE.
VARIABLE SPEED TRANSMISSION GEAR.
APPLICATION FILED JUNE 8, 1903.
NO MODEL. 4 SHEETS—SHEET 2.

No. 748,334. PATENTED DEC. 29, 1903.
V. G. APPLE.
VARIABLE SPEED TRANSMISSION GEAR.
APPLICATION FILED JUNE 8, 1903.
NO MODEL. 4 SHEETS—SHEET 3.

Witnesses:
Ray White
Harry P. Lulute

Inventor:
Vincent G. Apple
By Torée Bain
Atty.

No. 748,334. PATENTED DEC. 29, 1903.
V. G. APPLE.
VARIABLE SPEED TRANSMISSION GEAR.
APPLICATION FILED JUNE 8, 1903.
NO MODEL. 4 SHEETS—SHEET 4.

Witnesses:
Ray White
Harry C. White

Inventor
Vincent G. Apple.
By Foree Bain Atty

No. 748,334. Patented December 29, 1903.

UNITED STATES PATENT OFFICE.

VINCENT G. APPLE, OF DAYTON, OHIO, ASSIGNOR OF ONE-HALF TO HERBERT G. CATROW, OF MIAMISBURG, OHIO.

VARIABLE-SPEED-TRANSMISSION GEAR.

SPECIFICATION forming part of Letters Patent No. 748,334, dated December 29, 1903.

Application filed June 8, 1903. Serial No. 160,484. (No model.)

*To all whom it may concern:*

Be it known that I, VINCENT G. APPLE, of Dayton, in the county of Montgomery and State of Ohio, have invented certain new and useful Improvements in Variable-Speed-Transmission Gears; and I hereby declare that the following is a full, clear, and exact description thereof, reference being had to the accompanying drawings, which form part of this specification.

My invention relates to improvements in variable-speed-transmission gears designed to transmit power from a driving-shaft rotating at a constant speed to a driven shaft and operable to cause the rotation of the driven shaft at various speeds at the pleasure of the operator.

One of the objects of my invention is to provide a device of the class described wherein the entire transmission action is brought within the control of a single lever, proper movements whereof serve to increase or decrease the speed of the driven shaft to reverse the direction of rotation of the driven shaft, or to disconnect said shaft entirely from the driving-shaft.

A further object of my invention is to provide a construction wherein a counter-shaft is employed as an intermediary between a primary shaft element rotatable at a constant speed and a secondary shaft element to be driven therefrom to transmit from the primary element to the secondary element relatively low speed, but wherein direct connection is established between the primary and secondary shaft elements to the exclusion of the intermediate counter-shaft in transmitting to the secondary shaft element a speed of rotation coincident with that of the primary shaft element.

A further object of my invention is to provide means whereby during each shifting operation designed to change the speed of rotation of the driven shaft element by bringing into mesh new sets of suitably-proportioned power-transmitting devices associated therewith the driven shaft is entirely disconnected from the driving-shaft.

A further object of my invention is to generally simplify and improve the construction and arrangement of power-transmitting devices of the class described.

With a view to attaining these and other objects, which will become apparent to those skilled in the art from the following description, my invention consists in the features of construction and combinations and arrangements of parts hereinafter described, and specified in the claims.

Figure 2:
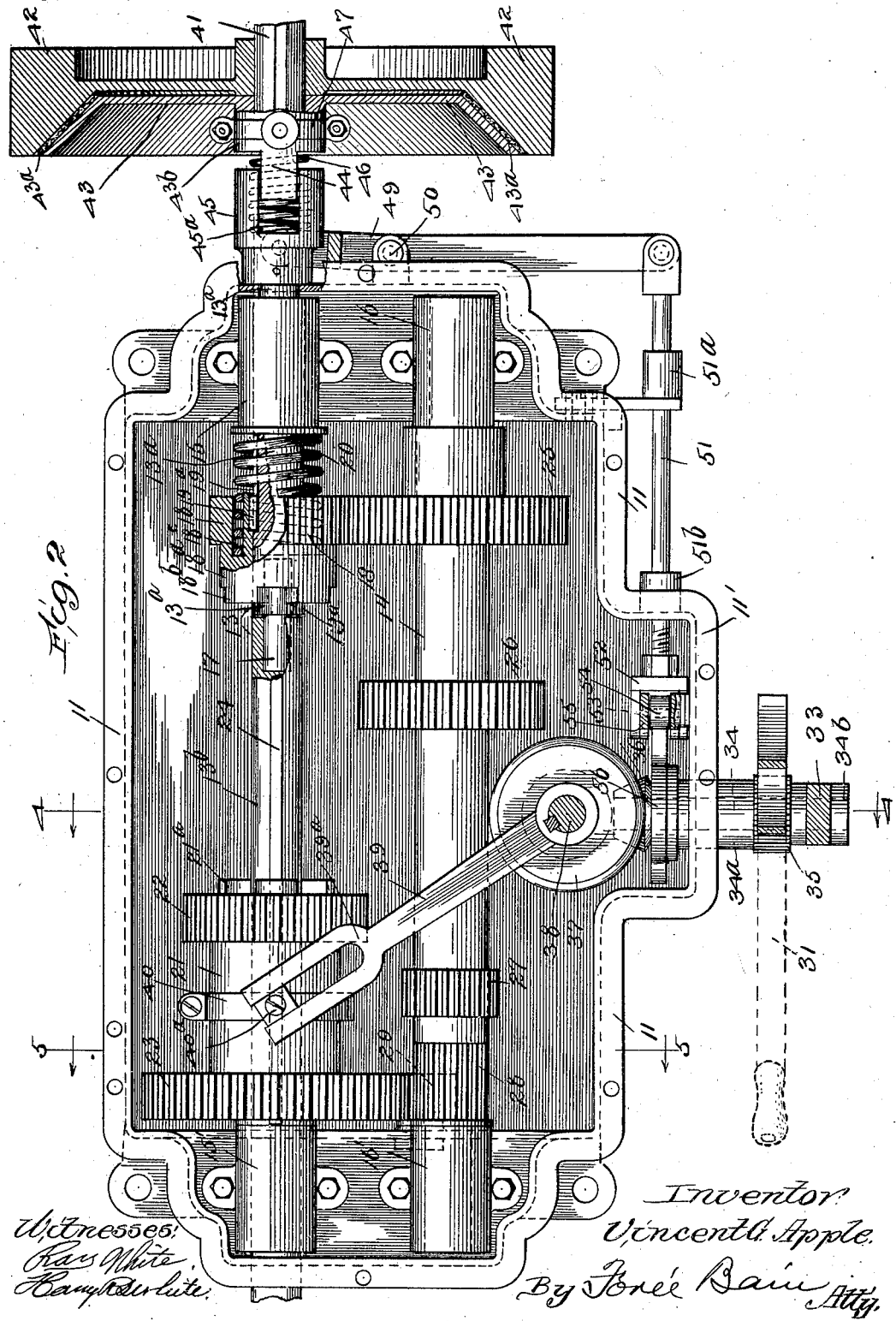
Figure 3:
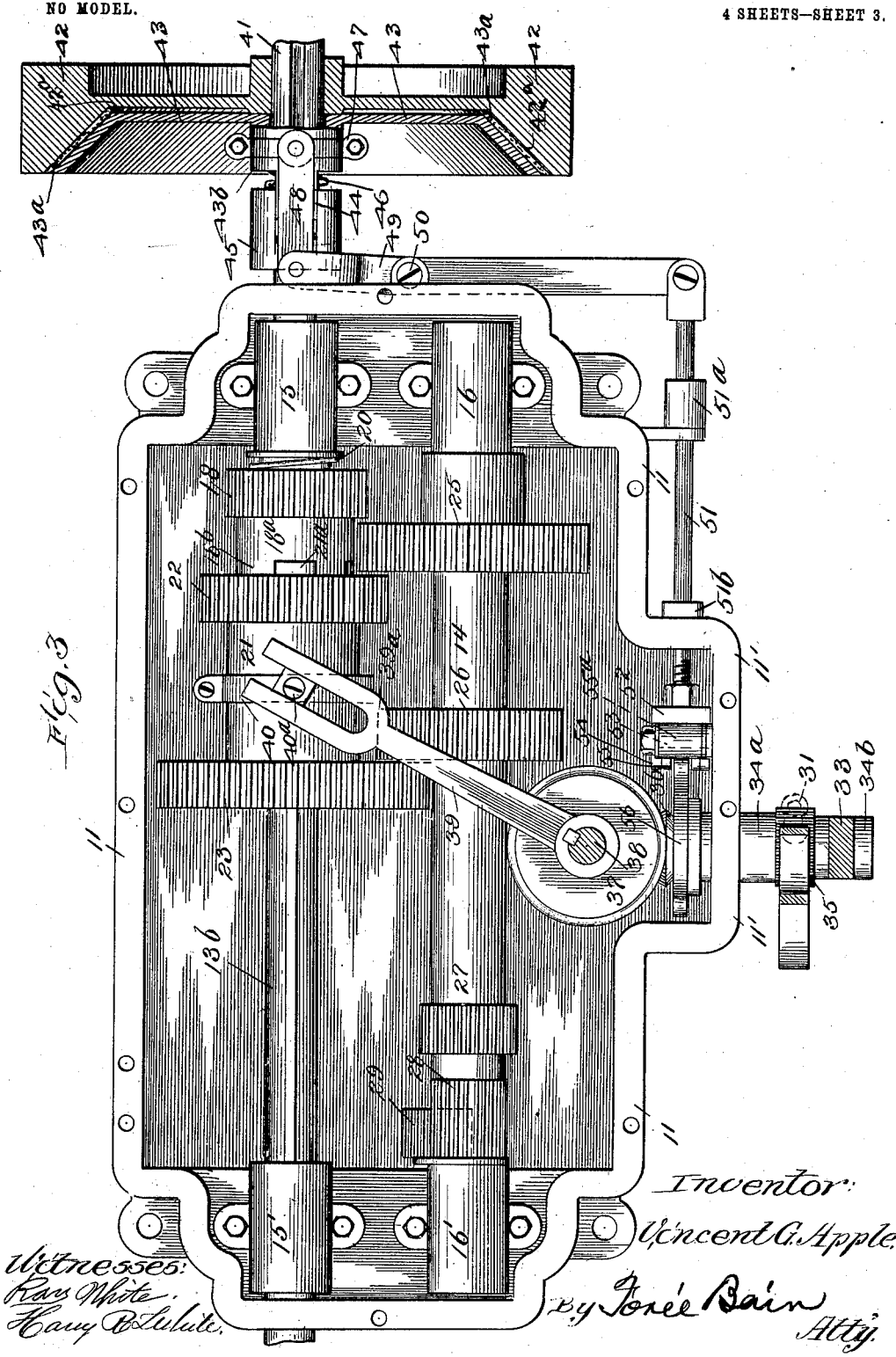
Figure 4:
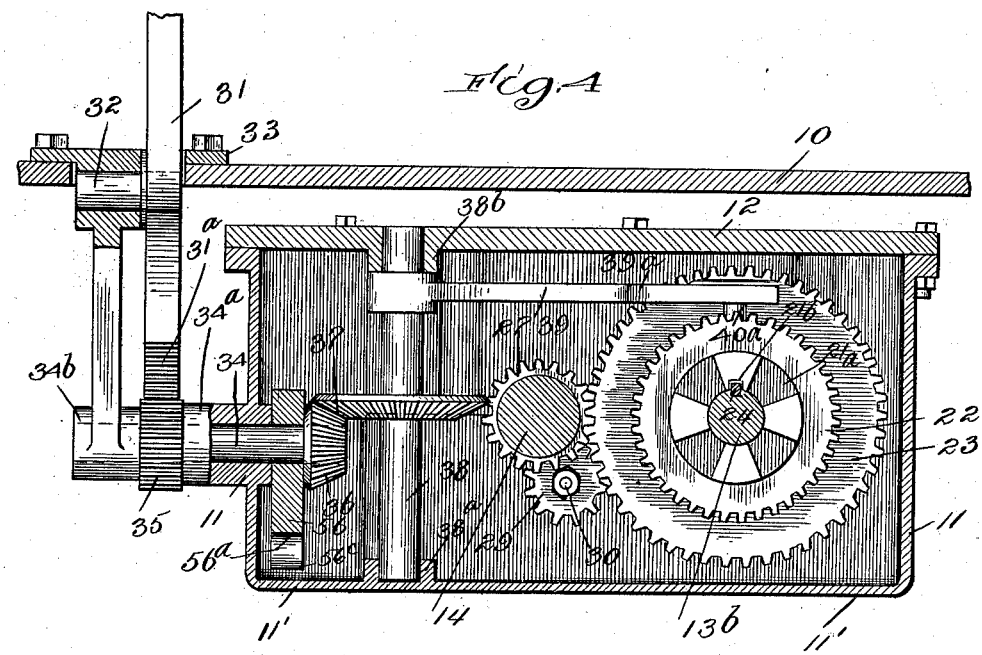
Figure 5:
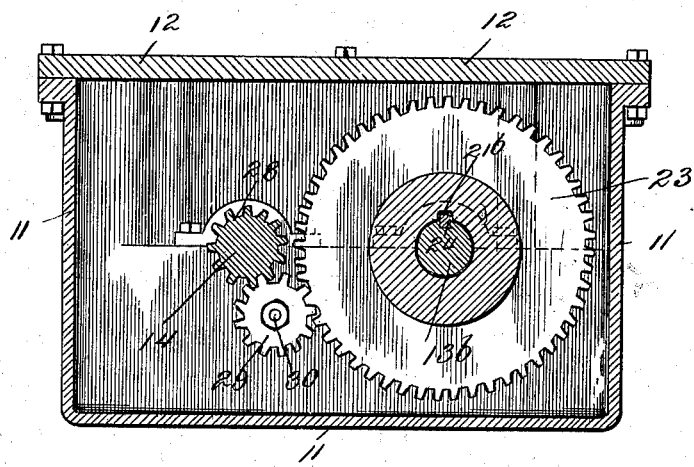

In the accompanying drawings, Figure 1 is a broken side elevation of an embodiment of my invention adapted for automobile or motor-vehicle use. Fig. 2 is a plan view of the same with the vehicle-floor and the cover-plate of the inclosing casing removed, the parts being shown in the position assumed when the device is reversed to back the driven mechanism. Fig. 3 is a view similar to Fig. 2, showing the position assumed by the parts when the driven mechanism is to be driven at the highest speed which the driving-shaft is capable of imparting thereto. Fig. 4 is a transverse section on line 4 4 of Fig. 2, and Fig. 5 is a section on line 5 5 of said Fig. 2.

Throughout the drawings like numerals of reference refer to like parts.

10 indicates a fragment of the body of a vehicle, such as its floor, below which is supported in any suitable manner (not shown) the metallic gear-casing 11. The gear-casing is generally rectangular in form, but is provided at one side with an offset portion 11', arranged about centrally of one of its longitudinal sides. The entire casing 11 is preferably made liquid-tight and is provided with a cover 12, adapted to be suitably secured thereon, so that the casing may in operation be sufficiently filled with oil, in which its contained mechanism will be submerged.

Within the casing 11 are mounted a sectional bodily-stationary driven shaft 13, carrying movable gears, a bodily-stationary counter-shaft 14, provided with stationary pinions adapted for coaction with the gears and certain of the actuating mechanism to be described.

The shafts 13 and 14 are preferably arranged in parallelism in a horizontal plane, and each finds bearings at the ends of the casing in companion bearing-brackets 15 15' and 16 16', respectively. The driven shaft 13 projects beyond the casing through suitable apertures at both ends, at its forward end being adapted for connection, through the intermediary of instrumentalities to be described, with the driving-shaft of the vehicle, while at its rear end it is adapted for connection (not shown) with the vehicle-wheels or other devices to be driven. The counter-shaft 14 is entirely contained within the casing 11.

The driven shaft 13 is divided longitudinally into two sections or elements, one of which, $13^a$, hereinafter arbitrarily termed the "primary shaft element," is adapted to receive its rotative impulse direct from the driving-shaft, so that when in operation it constantly moves at the same rotative speed as the said driving-shaft and serves as an intermediate element between the driving-shaft and the section $13^b$. The other section, $13^b$, which I will designate the "secondary shaft element," is the shaft member to be driven at various speeds and is connected to the section $13^a$ in axial alinement therewith by means of a dowel-pin 17, so as to be capable of rotation independently of the primary element.

By the construction hereinafter fully described the shaft member $13^b$ is adapted under proper conditions to be driven through the intermediary of the counter-shaft either in a forward or reverse direction at various speeds less than the speed of rotation of the primary driven shaft element or under other conditions to be driven direct from the primary driven shaft element at an even rotative speed therewith to the exclusion of the counter-shafts.

I have herein shown my invention as embodied in a gearing system adapted to transmit to the secondary driven shaft element three different speeds of forward rotation or a low-speed reverse rotation.

I will now describe the arrangement of the gearing employed, and for purposes of clearness will designate those gear-wheels carried by the driven shaft as "gears," and the gear-wheels carried by the counter-shaft as "pinions" irrespective of their relative proportions.

18 indicates a relatively large gear slidably mounted upon the primary shaft element $13^a$ and held against rotative movement relative to said shaft element by a feather 19, carried by the gear and engaging in a blind longitudinal groove $19^a$ in the said shaft element. The gear 18 is provided with a rearwardly-projecting hub $18^a$, from which project rearwardly clutch-teeth $18^b$, the combined length of the hub and clutch-teeth being greater than the width of the face of the gear 18. The arrangement of parts is preferably such that when the feather 19 is at the extreme rear end of its groove $19^a$ the rear edge of the clutch member $18^b$ closely approaches the plane of division of the shaft elements $13^a$ and $13^b$. A coiled spring 20 surrounds the shaft $13^a$ and is at one end seated in a recess $18^c$, made into the front face of the gear 18, its other end finding bearing against a fixed abutment, such as the bearing-block 15, whereby said spring normally holds the gearing 18 in its rearward limit of movement under yielding tension.

21 indicates a double gear member comprising a rearwardly-disposed large gear 23 and a forwardly-disposed gear 22, intermediate in size between the gears 18 and 23, the gears 22 and 23 being preferably integrally connected by a hub or barrel.

$21^a$ indicates clutch-teeth formed upon or secured to the front face of the gear 22 and adapted to coact with the clutch-teeth $18^b$ of the gear 18. The member 21 is provided with a groove $21^b$, arranged to embrace a longitudinally-disposed feather 24, seated in the shaft element $13^b$, whereby the member 21 is adapted to slide longitudinally of the shaft, while rotatively fixed thereto.

The pinions fixedly associated with the counter-shaft 14 are four in number and comprise three graduated pinions 25, 26, and 27, adapted to coact with the pinions 18, 22, and 23, respectively, and a reduced reversing-pinion 28, preferably cut into the shaft 14, as herein illustrated. The spacing arrangement of the pinions is important to secure an operative device, and the following relation is pointed out.

It will be noted that the distance separating the adjacent faces of pinions 25 and 26 is greater than the distance between gears 22 and 23, while the space separating the adjacent faces of pinions 26 and 27 is greater than the distance over all from the front face of pinion 22 to the rear face of pinion 23. The pinion 25 is so disposed that when the gear 18 is in normal position said transmission members are in mesh, while the pinion 27 is so related to the pinion 28 that when the gear 23 is at one limit of its movement, overlying the pinion 28, the gear 22 is out of mesh with the pinion 27, as illustrated in Fig. 2. The gear 23 and pinion 28 do not intermesh, as may be seen in Figs. 2 and 5; but a small pinion 29, mounted on a bearing-pin 30, mounted at the rear end of the casing 11, is arranged to transmit motion from the pinion 28 to gear 23 when the latter is brought to its rearmost position of movement, as illustrated in Fig. 2.

Means operable from the exterior of the casing are provided for shifting the gear member 21 longitudinally of its shaft 13, and these means I will now describe.

31 indicates an operating-lever arranged to project above the floor 10 of the vehicle in position for convenient manipulation by the vehicle operator. Said lever is pivoted at 32 in a bracket 33, depending from the floor 10, and below said pivot is provided with a toothed gear-segment $31^a$.

34 indicates a short shaft arranged below the segment $31^a$, at right angles thereto and projecting through the side wall of the offset portion 11' of the casing. Said shaft finds suitable bearing in bosses 34ª and 34ᵇ, formed therefor, respectively, upon the wall of casing 11' and the lower end of the bracket 33.

35 indicates a small pinion fixed to the shaft 34 and adapted to mesh with segment 31ª, so that oscillating movement of the handle 31 will be imparted through the segment and pinion to the shaft. At its inner extremity the shaft 34 carries a beveled pinion 36, arranged in mesh with a complementary gear 37, carried by a vertical shaft 38, supported in suitable bearings 38ª and 38ᵇ, provided therefor in the top and bottom of the casing 11. The shaft 38 has keyed thereto a lever-arm 39, arranged for a clear sweep over the shaft 13 and 14 and such of the pinion members as lie in its path of movement. At its free extremity the arm 39 is bifurcated, as illustrated at 39ª, its forked end slidingly embracing a swivel-block 40ª, pivotally secured to the gear member 21, as by a suitable split collar 40. It will be apparent now that oscillation of the lever 32 will be transmitted to the intermeshing gears and the shaft to the arm 39, causing it to swing pivotally with its shaft 38 toward the front or rear end of the casing, according to the direction of movement of the lever, in its movement sliding the gear member 21 along its shaft 13, the swivel-block and forked connection compensating for the divergence of the paths of movement of the lever and gear member.

I prefer to provide in conjunction with my transmission means whereby the primary shaft element may be uncoupled from the driving-shaft, so that no power is transmitted therefrom to the primary or secondary elements, and also to provide such a construction that the said driven shaft elements are automatically disconnected from the driving-shaft during the time when the movable gear member 21 is being shifted along the shaft 13 to effect a change of rotative speed of the secondary element of the driven shaft. To this end a clutch connection is established between the driving and driven shaft, and the operation of the clutch is made dependent upon the operation of the lever 31, so that movement of said lever to effect a change of speed of the driven devices automatically disconnects the clutch members, disconnecting the driving and driven shafts.

In the drawings, 41 indicates a driving-shaft, to which is keyed the usual fly-wheel 42, the rim whereof is dished toward its rear side, as indicated at 42ª, to form the bodily-stationary member of a friction-clutch.

43 indicates a coacting bodily-movable friction-clutch member provided with a suitable beveled friction-surface 43ª, adapted to contact with the dished surface 42ª of the fly-wheel, and also provided with a hub 43ᵇ, loosely mounted on the shaft 41. The hub 43ᵇ has projecting rearwardly therefrom tongues 44, arranged to slidingly engage in grooves 45ª, formed to receive them in a collar 45, fixedly secured to the forwardly-projecting end of shaft element 13ª. The collar 45 is recessed, as indicated at 45ᵇ, to afford a seat and end bearing for coiled spring 46, whose opposite end bears against the collar 43ᵇ of the movable clutch member, thereby tending to hold it normally in engagement with the fly-wheel member of said clutch.

47 indicates a split shipper-collar secured upon the hub 43ᵇ of the friction-clutch member 43 and connected by links 48 with the upper and lower fork-arms of a bifurcated shipper-lever 49, the links 48 being pivotally connected to said members at opposite ends. The shipper-lever 49 has a pivotal bearing, as at 50, in a suitable bracket projecting from the casing 11 and at its outer extremity is pivotally connected to the end of a push-rod 51, which extends through a bracket 51ª, secured to the casing 11, and a boss 51ᵇ, formed in the projecting portion 11' of the casing. Within the casing the push-rod 51 is provided with a bifurcated head 52, which affords support for a pin 53, on which is mounted an antifriction-roller 54. The head is preferably held against vertical deflection by link members 55, pivotally connected to the pin 53 on opposite sides of the antifriction-roller and pivoted at their upper ends to pin 55ª, suitably mounted in the containing-case 11. Coacting with the push-rod 51 is a cam 56, fixedly secured to the shaft 34 for oscillation therewith. The cam is formed with four seats or depressions 56ª to correspond with the four alternative positions of the speed-changing gear, the angular relations of such depressions being such that movement of the cam-carrying shaft through arcs corresponding therewith will serve to bring the movable gear member 21ª into its successive positions of operation. Intermediate the depressions are arranged tooth-like projections 56ᵇ, each having at its crown a slight depression 56ᶜ, adapted to receive and securely seat the antifriction-roll 54 of the push-rod.

It will be apparent now that when shaft 34 is rotated, carrying with it the cam 56, the passage of each tooth by the push-rod roller 54 advances the push-rod, withdrawing the forked end of the shipper-lever rearwardly, and so throwing the movable clutch member out of mesh with the fly-wheel member, while when the cam is so positioned that the roller 54 rests in a seat 56ª the clutch members are in operative engagement.

The use and operation of my invention are as follows: Assuming now that the lever 31 is in its rearmost position, with the roller 54 of the push-rod seated in the first or uppermost depression 56ª in the cam 56 and the movable gear member 21 correspondingly positioned, with its gear 23 in mesh with the idler-pinion 29, as illustrated in Figs. 1 and 2, it will be apparent that motion is transmitted from the constantly-revolving driving-shaft 41 through the coacting clutch members 42 and 43 and the rotatively-fixed connection between the said clutch member 43 and the driven-shaft element 13ª to said primary shaft element, rotating the gear-wheel 18, carried by said primary element in the direction of rotation of the driving-shaft. Slower speed of rotation in the opposite direction is imparted to the counter-shaft 14 through the intermeshing gear and pinion 18 and 25, and the said counter-shaft imparts rotation again in a forward direction to the idler 29, which in turn meshes with the gear 23, rotatively fixed to the element 13ᵇ of the driven shaft, imparting very slow rotation to said shaft element 13ᵇ in a reverse direction, or, in other words, in a direction opposite to the direction of rotation of the primary element 13ª of the driven shaft 13. If now it be desired to drive the vehicle-wheels or other driven devices at a slow speed in a forward direction, the lever 31 is pushed forward, so that it rotates the transverse shaft 24, causing the arm 39 to sweep forward, carrying with it the movable gear member 31 until the gear member 23 is moved into direct engagement with the pinion 27 of the counter-shaft. Now it will be obvious that power is transmitted from the driving-shaft to the primary section of the driven shaft and by the intermeshing gears 18 and 25 to the counter-shaft to drive the latter in a reverse direction. From said counter-shaft power is transmitted by the intermeshing pinion 27 and gear 23 to the secondary element 13ᵇ of the driven shaft, rotating it in a forward direction at a slow speed.

It will be noted that during the movement of the shaft 34 the cam 56 is advanced, so that the roller 54 of the push-rod 51 engages in the next succeeding depression therein. During this movement it will be apparent that the tooth intervening between the depression must pass the roller 54, its inclined edges during such movement advancing the push-rod 51 in a forward direction. The sides of the teeth are made as nearly radial as practical, so that the movement of the push-rod in either direction is very quickly accomplished, while during the greater part of the movement the push-rod is held in advanced position by the crown of the tooth intervening between the recesses. As has been heretofore described, the forward movement of the push-rod 51 serves to rock the lever 49, withdrawing its inner or forked end, and frictionally disengaging the clutch devices, so that power is no longer transmittted from the driving-shaft to the driven-shaft element 13ª. Thus it will be seen that during the forward movement of the lever resulting in the longitudinal shift of the movable gear member 21 to occasion a new speed adjustment of the secondary section of the driven shaft the clutch devices are disconnected and power is not applied to the driven shaft to rotate the same. Consequently the transfer of the gear member from pinion to pinion is effected without liability to stripping either of the gearing devices, as is the case when the shift is made with full power applied to the driving-shaft. It will be apparent that the farther forward movement of the lever will advance the gear member 21, so that the gear 23 disengages with the pinion 27 and the gear 22 comes into mesh with the pinion 26 of the driven shaft. The ratio of the pinion to the gear being largely increased in this new arrangement, it will be apparent that the driven-shaft element 13ᵇ will be rotated at a higher speed than in the previous adjustment. The last or final adjustment to impart to the secondary driven-shaft section 13ᵇ the highest speed of rotation which is designed to be imparted thereto—that is, the rotative speed of the driving-shaft—is accomplished by the forward movement of the lever 31 to its most advanced position. The effect of this movement is to cause the parts to assume the position illustrated in Fig. 3. The advance of the sliding gear member 21 by the lever 32 first causes its gear 22 to leave its position of mesh with the gear 26 and its clutch-teeth 21ª to engage the coacting clutch-teeth 18ᵇ of the gear 18 on the primary shaft-section. The forward movement of the gear member 21 continuing pushes the gear 18 forward along its shaft member 13ª until the gear 18 disengages with the pinion 25 of the counter-shaft shown in Fig. 3. The proportions of the devices as heretofore described are such that at this stage the counter-shaft 18 has no one of its pinions in mesh with a driving-gear, so that the counter-shaft is idle. It will be apparent now that power is transmitted from the driving-shaft to the clutch instrumentalities, as heretofore described, to the primary driven-shaft element 13ª, and thence by the intermeshing clutch members of gear 18 and gear member 21 to the driven-shaft element 13ᵇ, rotating the latter in a forward direction at the same rate as the driving-shaft and primary driven-shaft section.

The advantages of thus securing a direct connection between the sections of the divided driven shaft to the exclusion of the counter-shaft will be apparent to those skilled in the art; but it may be mentioned that the positive connection between the driving-shaft and the secondary driven-shaft element insures the highest efficiency of power transmission, while the freeing of the counter-shaft prevents the loss of motion and excessive wear due to idle rotation of said shaft.

It will be apparent that by the use of the device herein described the operator of a motor-vehicle or the like has placed within his control by the operation of a single lever all the speed-changing operations of the machine. These operations are performed by the movement of the lever in its natural direction—that is to say, the forward movement of the lever always producing higher forward speed and the maximum rearward movement of the lever reversing the direction of drive of the machine. Further, it will be noted that at any time the operator can disconnect his power by moving his lever to throw the cam half-way toward the next adjacent seat or recess, thereby operating the push-rod to disconnect the clutch members.

While I have herein described in some detail the present illustrative embodiment of my invention, I do not desire to be understood as limiting myself specifically thereto in all of its details.

Having thus described my invention, what I claim, and desire to secure by Letters Patent of the United States, is—

1. In a device of the character described, a driving-shaft, a shaft element to be driven, a bodily-stationary primary driven-shaft element interposed between the driving-shaft and the shaft element to be driven, variable gearing connections between the said primary shaft element and the shaft element to be driven, operating means for varying said gearing connections, a clutch member carried by the driving-shaft, a bodily-movable clutch member arranged to coact therewith, means connecting said movable clutch member and the primary shaft element for rotation, and means interposed between the movable clutch member and the operating means for automatically disconnecting said clutch members during a movement of said operating means to vary the geared relations of the primary shaft element and the shaft element to be driven.

2. In a device of the character described, the combination with a driving-shaft and a clutch member secured thereto, of a shaft element to be driven, an intermediate shaft element, a counter-shaft, a clutch member carried by the intermediate shaft adapted to coact with the clutch member of the driving-shaft, said clutch elements being relatively movable for disengagement, gear members carried by the shaft element to be driven, the intermediate shaft element, and the counter-shaft, one of said gear members being movable to effect speed-changing variations in the geared relations of the intermediate shaft element and the shaft element to be driven, an operating device for the movable gear member comprising a shaft, an operative connection between said shaft and the movable gear to effect movement of the gear member coincidently with the shaft, and an oscillating lever associated with said shaft, and means operatively connecting the gear operating devices with the relatively movable clutch element, whereby movement of the said operating device to effect a movement of the gear member serves to automatically disengage the clutch elements.

3. In a device of the character described, the combination with the driving-shaft, of a shaft element to be driven, connections between said driving-shaft and the shaft to be driven, including a clutch device and variable-speed gearing having a movable speed-changing gear element, operating devices for shifting the movable speed-changing gear element to vary the geared relations of the driving-shaft and the shaft to be driven, comprising a rotatable shaft, a shaft-actuating lever, and an operative connection between the shaft and the movable speed-changing gear element, and means for actuating the clutch to automatically disconnect the driving-shaft and the driven shaft during the shifting movement of the speed-changing gear element, said means comprising a cam mounted on the shaft of the operating device, and suitable connections between the cam and the clutch.

4. In a device of the character described, a driven shaft comprising two independently-rotatable elements, a counter-shaft bodily stationary relative thereto, coacting clutch members, one of which is bodily movable, carried by the shaft elements, gear connections between each of the shaft elements and the counter-shaft, each connection including a gear element shiftable to disconnect the corresponding shaft element from the counter-shaft, and means for simultaneously actuating the clutch devices to connect the two driven-shaft elements and to disconnect both elements thereof from the counter-shaft.

5. In a device of the character described, a bodily-stationary driven shaft comprising two independently-rotatable elements, a bodily-stationary counter-shaft, pinions arranged on the counter-shaft, a shiftable gear carried by each of the driven-shaft elements, each adapted to mesh with a counter-shaft pinion, coacting clutch members one of which is shiftable, carried by the driven-shaft elements, and means for simultaneously shifting the gears and the shiftable clutch member to connect the shaft elements through the clutch and disengage the said elements from the counter-shaft through the gears, or vice versa.

6. In a device of the character described, a bodily-stationary driven shaft comprising two independently-rotatable elements, a bodily-stationary counter-shaft, pinions carried by the counter-shaft, a shiftable gear carried by each of the driven-shaft elements adapted to engage a corresponding pinion of the counter-shaft, coacting clutch devices carried by the shiftable gears of the respective shaft elements and means for actuating the shiftable gears to connect the driven-shaft elements through the clutch devices and disconnect them from the counter-shaft, or vice versa.

7. In a device of the character described, a driving-shaft, a shaft element to be driven, a primary shaft element, a clutch device adapted to connect the driving-shaft with the primary shaft element, variable-speed gearing including a shiftable element, arranged to connect the primary shaft element and the shaft element to be driven, means for operating said shiftable element to vary the geared relation of said shaft elements, said means including a rotatable shaft, a cam 56 carried by said shaft, a push-rod 51 operatively associated with the cam 56, and an operative connection between the said push-rod and the clutch devices.

8. In a device of the character described, a shaft to be driven, a counter-shaft parallel thereto, gear connections between said shafts including a gear member slidably mounted on one of said shafts, a shaft 38 arranged at right angles to the plane of the first-said shafts, a lever-arm carried by the shaft 38 having a longitudinal opening therein, a projection carried by the slidable gear member engaging said opening in the lever-arm, and means for rotating the shaft 38.

In testimony that I claim the foregoing as my own I affix my signature in presence of two witnesses.

VINCENT G. APPLE.

In presence of—
GEORGE T. MAY, Jr.,
MARY F. ALLEN.